United States Patent [19]
Fujibayashi

[11] Patent Number: 5,754,277
[45] Date of Patent: May 19, 1998

[54] IMAGE FORMING METHOD AND APPARATUS WITH DETECTION OF FOCUS STATE OVER PLURAL AREAS IN AN IMAGE

[75] Inventor: Kazuo Fujibayashi, Kawasaki, Japan

[73] Assignee: Canon Kabushiki Kaisha, Tokyo, Japan

[21] Appl. No.: 534,166

[22] Filed: Sep. 26, 1995

[30] Foreign Application Priority Data

Sep. 29, 1994 [JP] Japan ................................ 6-259411
Sep. 6, 1995 [JP] Japan ................................ 7-255632

[51] Int. Cl.⁶ ................................ G03B 13/28
[52] U.S. Cl. ................................ 355/45; 355/55
[58] Field of Search ................................ 355/45, 53, 55, 355/66

[56] References Cited

U.S. PATENT DOCUMENTS 4,695,155  9/1987  Ishii et al. ........................... 355/45
4,988,187  1/1991  Kuriyama ........................... 355/55 X
5,114,223  5/1992  Torigoe et al. ..................... 355/53 X

FOREIGN PATENT DOCUMENTS

63-70812   3/1988  Japan.
63-70813   3/1988  Japan.
63-70816   3/1988  Japan.
63-316838  12/1988 Japan.

*Primary Examiner*—Fred L. Braun
*Attorney, Agent, or Firm*—Fitzpatrick, Cella, Harper & Scinto

[57] ABSTRACT

In an image forming apparatus, an image illuminated by an illumination device is projected on a screen or on a recording medium. The focus state of the projected image is detected by a focus detection unit. At least a part of the focus detection unit is moved to detect the focus state over plural areas in the projected image.

8 Claims, 7 Drawing Sheets

IMAGE FORMING METHOD AND APPARATUS WITH DETECTION OF FOCUS STATE OVER PLURAL AREAS IN AN IMAGE

BACKGROUND OF THE INVENTION

1. Field of the Invention

The present invention relates to an image forming apparatus having a focus detection means and, more particularly, to an image forming apparatus having a focus detection means, which can detect a focus state of an image projected on a screen or an image projected on a recording medium by a projection lens to always obtain a projected in-focus image and is suitable for, e.g., a microfilm reader or a microfilm reader/printer.

2. Related Background Art

A typical image forming apparatus such as a microfilm reader/printer has a reader unit (observation system) for enlarging and projecting a projected image (image information) of a microfilm recorded with a reduced image on a screen by a projection lens, and a printer unit (recording system) for projecting and recording the projected image on a photosensitive material by the projection lens and outputting the image as a copy.

In many microfilm reader/printers, a projection lens is manually moved in a direction of optical axis, thereby obtaining a projected image focused on a screen or a photosensitive material.

In this operation, a focusing operation is troublesome. Readers/printers capable of performing automatic focusing in a short time by using a focus detection means are recently required.

Generally, in an image forming apparatus, when a projection lens having a projection magnification as large as 40 to 50 times is used, the depth of focus becomes as small as about 0.02 mm. For this reason, to form a sharp projected image on a screen or a photosensitive drum, a high optical precision is required for the focus detection means.

An image forming apparatus using a focus detection means is proposed in, e.g., Japanese Laid-Open Patent Application Nos. 63-316838 and 63-70813.

In Japanese Laid-Open Patent Application No. 63-316838, a reader system optical path for projecting an enlarged image and a focus detection optical path for guiding a light beam to a focus detection light-receiving element are arranged. A secondary imaging lens is arranged in this focus detection optical path, thereby reducing a projected image from a projection lens and forming the image on the light-receiving element. A signal obtained from the light-receiving element is used to perform focus adjustment.

In Japanese Laid-Open Patent Application No. 63-70813, an image sensor is arranged to read a projected image. A contrast signal associated with the projected image is obtained from each of a plurality of areas of the image sensor. A position on the optical axis of a projection lens, where the contrast signal is maximized, is obtained as an in-focus position with respect to the corresponding area. Of the in-focus positions of the respective areas, a set of in-focus positions including the largest number of in-focus positions close to each other is used to determine the in-focus position of the projection lens, thereby performing focus adjustment.

Since the focus detection means used in the conventional image forming apparatus uses a reduction optical system as a focus detection system, a focus detectable area for performing focus detection, i.e., a so-called distance measurable area is limited to an area at the central portion of a frame. This area is relatively small with respect to the overall frame (overall projected image). For this reason, when no image which can be subjected to distance measurement is formed on the distance measurement area in a projected image, focus detection cannot be performed.

SUMMARY OF THE INVENTION

It is an object of the present invention to provide an image forming apparatus having a focus detection means and suitable for a microfilm reader or microfilm reader/printer, in which, when an image is to be projected from a projection lens onto a screen or a photosensitive material (recording medium), a light beam split means, a focus detection unit, and the like are appropriately arranged on the exit side of the projection lens, and these elements are appropriately displaced, thereby precisely performing focus detection in a plurality of areas in a projected image.

According to the present invention, there is provided an image forming apparatus comprising illumination means for illuminating an image, projecting means for projecting the image illuminated with the illumination means on a predetermined surface, and focus detection means for detecting a focus state of an image projected by the projecting means, wherein at least part of the focus detection means is moved to detect the focus states in a plurality of areas in the projected image.

The image forming apparatus having the focus detection means of the present invention further comprises light beam split means, arranged on the exit side of a projection lens, for reflecting part of an incident light beam when the image illuminated with the illumination means on a screen surface or a recording medium surface by the projection lens, an imaging lens, and a focus detection unit for detecting a the focus state on the projection surface of the projection lens, the focusing lens and the focus detection unit being arranged on an opposite side of the light beam split means. When the focus state is to be detected by the focus detection unit, the imaging lens and the focus detection unit are integrally pivoted, and a light beam from one of the plurality of areas in the image projected on the projection surface is selected and used, thereby performing focus detection in the plurality of areas in the projected image.

Particularly, in the focus detection unit, light beams passing through different areas of the pupil of the projection lens are condensed by a pair of imaging lenses for focus detection to form a pair of light amount distributions associated with the projected image on a light-receiving element, and a signal from the light-receiving element is used to obtain the relative positional relationship between the pair of light amount distributions, thereby performing focus detection. When the imaging lens and the focus detection unit are integrally pivoted, an optically substantially conjugate relationship is maintained between the entrance pupils of the pair of imaging lenses for focus detection and the exit pupils of the projection lens.

In addition, the image forming apparatus having the focus detection means comprises light beam split means, arranged on the exit side of a projection lens, for reflecting part of an incident light beam when the image illuminated with the illumination means is to be projected on the projection surface such as a screen surface of a recording medium surface by the projection lens, an imaging lens arranged on an opposite side of the light beam split means, and a focus detection unit for detecting the focus state on the projection surface of the projection lens. When the focus state is to be detected by the focus detection unit, the imaging lens and the focus detection unit are integrally moved in a direction perpendicular to the optical axis of the projection lens while changing the inclination of the light beam split means with respect to the optical axis of the projection lens, and a light beam from one of the plurality of areas in the image projected on the projection surface is selected and used, thereby performing focus detection in the plurality of areas in the projected image.

Particularly, in the focus detection unit, light beams passing through different areas of the pupil of the projection lens are condensed by a pair of imaging lenses for focus detection to form a pair of light amount distributions associated with the image projected on a light-receiving element, and a signal from the light-receiving element is used to obtain the relative positional relationship between the pair of light amount distributions, thereby performing focus detection. When the imaging lens and the focus detection unit are integrally moved in a direction perpendicular to the optical axis of the projection lens while changing the inclination of the light beam split means with respect to the optical axis of the projection lens, an optically substantially conjugate relationship is maintained between the entrance pupils of the pair of imaging lenses for focus detection and the exit pupils of the projection lens.

DETAILED DESCRIPTION OF THE PREFERRED EMBODIMENTS

Figure 1:
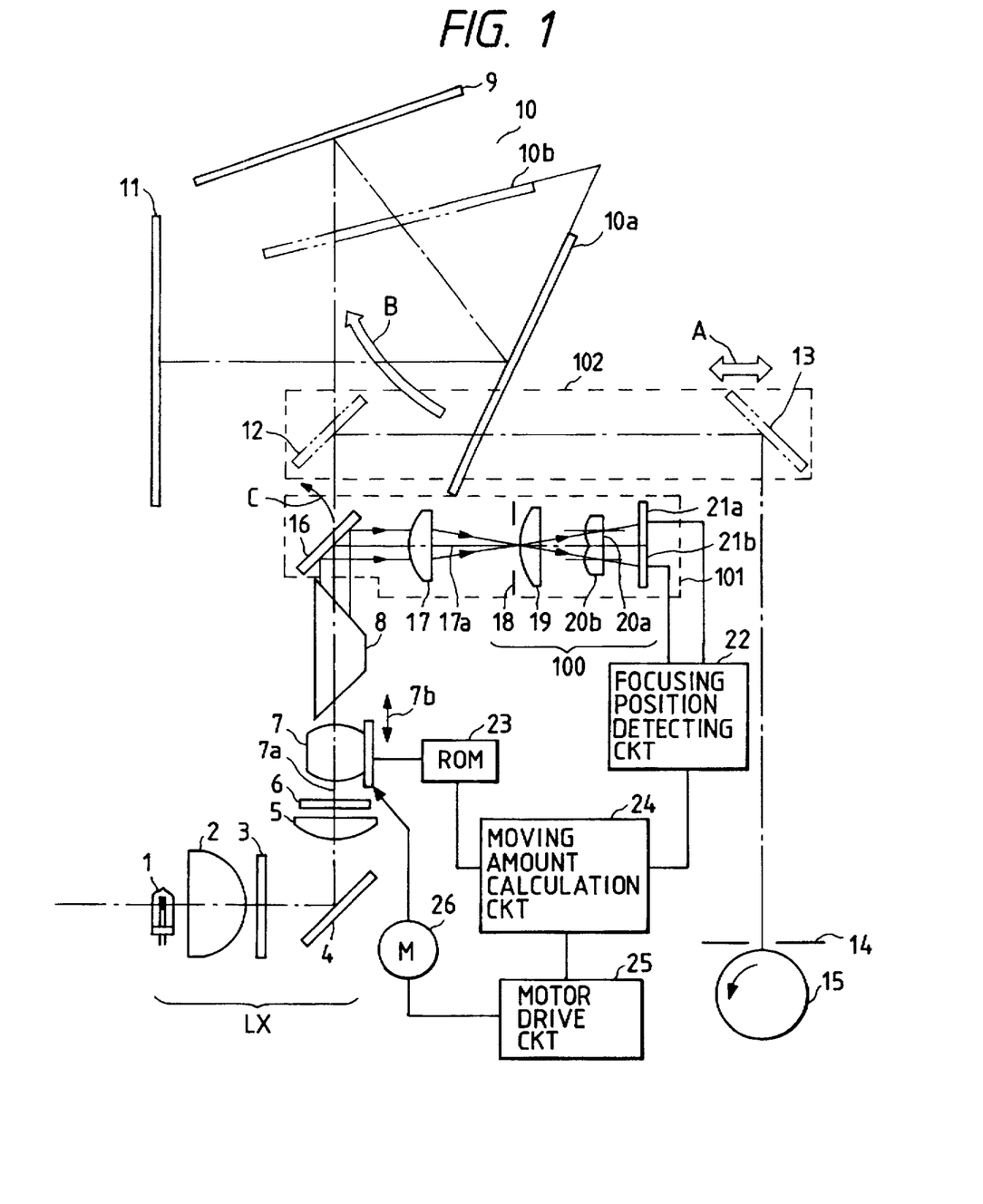
FIG. 1 is view schematically showing the main part of an image forming apparatus according to the first embodiment of the present invention.

FIG. 1 is a view schematically showing the main part of the optical system of an image forming apparatus according to the first embodiment of the present invention. FIGS. 2 to 5 are explanatory views of part of FIG. 1.

Referring to FIG. 1, a light source means 1 is constituted by, e.g., a halogen lamp or a fluorescent light. A condenser lens 2 condenses a light beam from the light source means 1. Heat-insulating glass 3 and a cold mirror 4 serve as optical members for removing an infrared light component from a light beam radiated from the light source means 1 to suppress an increase in temperature on a projected image 6. The apparatus also includes a field lens 5. In this embodiment, the elements 1 to 5 constitute an illumination means (illumination optical system) LX.

The transmission type projected image (image information) 6 is formed of, e.g., a microfilm. A projection lens 7 enlarges and projects the image 6 on a screen 11 or a photosensitive drum (recording medium) 15.

Movement of the projection lens 7 is controlled by a driving means 26 on the basis of a signal (output value) obtained from a focus detection means 101 (to be described later), as indicated by an arrow 7b, on an optical axis 7a. With this arrangement, focus adjustment (focusing) of a projected image on a screen 11 is performed.

Figure 2:
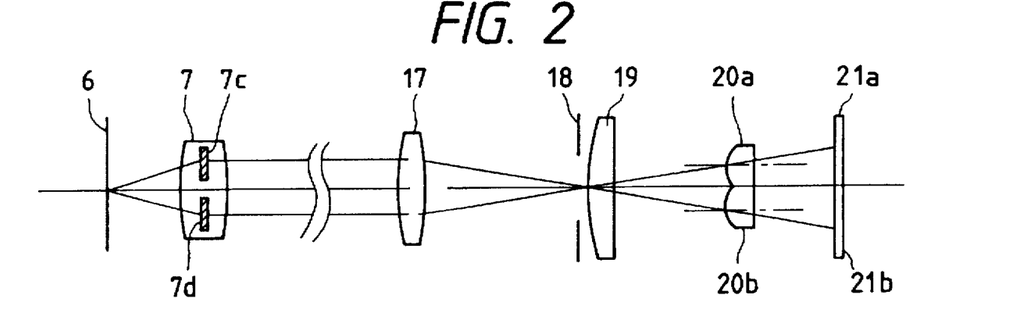
FIG. 2 is a view schematically showing a state wherein an optical path as part of FIG. 1 is developed.

A rotation prism 8 is arranged on the exit surface side of the projection lens 7 (to perform position adjustment of a projected image on the screen 11), as shown in FIG. 2. The optical axis 7a of the projection lens 7 coincides with an entrance optical axis of the rotation prism 8. The rotation prism 8 can be rotated about the optical axis 7a of the projection lens 7 as the rotation axis.

A light beam split means 16 is constituted by a half mirror or a total reflecting mirror. The light beam split means 16 is arranged in an optical path on the exit side of the rotation prism 8 between the rotation prism 8 and screen 11 and splits part or all of a light beam from the rotation prism 8.

An imaging lens (reduction lens) 17 is used for focus detection. An optical axis 17a of the imaging lens 17 is set to coincide with the exit optical axis of the rotation prism 8, as shown in FIG. 1.

A mask 18 for focus detection limits the light amount incident on a line sensor 21. A field lens 19 for focus detection has an optical function for guiding a projected image formed by the imaging lens 17 onto the line sensor 21 through reimaging lenses 20a and 20b. The pair of imaging lenses (reimaging lenses) 20a and 20b for focus detection are arranged symmetrical with respect to the optical axis. The light-receiving element 21 for focus detection is constituted by line sensors (CCDs) 21a and 21b.

In this embodiment, the elements 18, 19, 20a, 20b, and 21 constitute a focus detection unit 100, and the half mirror 16, the imaging lens 17, and the focus detection unit 100 constitute the focus detection means 101. The focus detection method of this embodiment uses a known so-called image displacement.

As will be described later, in this embodiment, the imaging lens 17 and the focus detection unit 100 are integrally rotated to select a light beam from a plurality of areas in the projected image area, thereby selecting one of the plurality of areas in the projected image for focus detection.

FIG. 2 is a view schematically showing a state wherein the optical path of the optical system for detecting a focal point of the projection lens 7 is developed.

A focusing position detecting circuit 22 detects a focus state of the projection lens 7 by using output signals from the line sensors 21a and 21b. A moving amount calculation circuit 24 calculates the moving amount of the projection lens 7 on the optical axis by using an output signal from the focusing position detecting circuit 22, data from a ROM 23 storing the magnification information of the projection lens 7, and the like. A motor drive circuit 25 moves the projection lens 7 on the optical axis through the drive motor 26 on the basis of a signal from the moving amount calculation circuit 24.

A movable print scanning unit 102 has a scanning mirror 12 and a scanning mirror 13. The movable print scanning unit 102 moves into the optical path in a printing operation as indicated by an arrow A in FIG. 1, and retreats from the optical path in a reading operation. The print slit 14 limits an amount of light exposed onto the photosensitive drum 15. The photosensitive drum 15 is a recording medium. The system also includes a read reflecting mirror 9, a read pivotal mirror 10 which pivots to a position 10a in a reading operation, as indicated by an arrow B, and to a position 10b in a printing operation.

In this embodiment, a light beam radiated from the light source means 1 is condensed by the condenser lens 2, transmitted through the heat-insulating glass 3, and reflected by the cold mirror 4. Thereafter, the light beam illuminates the effective illumination area of the projected image 6 through the field lens 5. The light beam based on the image 6 passing through the projection lens 7 passes through the rotation prism 8, and is split by the half mirror 16 into two directions, i.e., toward the screen 11 (and the photosensitive drum 15) and the focus detection means 101.

In this embodiment, the respective elements are set such that a light beam from the light source means 1 is converged (formed into an image) near the entrance pupil of the projection lens 7, i.e., Köhler illumination is performed.

In a reading operation in which the projected image 6 is observed on the screen 11, the light beam transmitted through the half mirror 16 is guided onto the screen 11 through the reflecting mirror 9 and the pivoting mirror 10 to form an enlarged projected image onto the screen 11.

In a printing operation in which a projected image is formed on the photosensitive drum 15, the print scanning unit 102 moves into the optical path, as indicated by the arrow A, to cause the light beam transmitted through the half mirror 16 to be reflected by the scanning mirror 12 and the scanning mirror 13 and incident on the photosensitive drum 15. An enlarged projected image is formed on the photosensitive drum 15.

At this time, the scanning mirror 12 and the scanning mirror 13 are integrally moved to scan the photosensitive drum 15 in a sub-scanning direction, thereby projecting and recording image information of the overall projected image 6 on the photosensitive drum 15.

On the other hand, a light beam based on the projected image reflected by the half mirror 16 is focused on the mask 18 (expected imaging plane) by the imaging lens 17. The imaged projected image is projected on the line sensors 21a and 21b by the reimaging lenses 20a and 20b through the field lens 19.

More specifically, the projected image formed near the mask 18 is formed as two (pair) projected images on the line sensors 21a and 21b by the reimaging lenses 20a and 20b. The interval between the two projected images (light amount distributions) at that time is obtained by the focusing position detecting circuit 22, thereby detecting a focus state of the projection lens 7.

A signal from the focusing position detecting circuit 22, data from the ROM 23 storing the magnification information of the projection lens 7, and the like are used to obtain the moving amount of the projection lens 7 on the optical axis by the moving amount calculation circuit 24. On the basis of a signal from the moving amount calculation circuit 24, the projection lens 7 is moved on the optical axis by the drive circuit 25 through the drive motor 26.

As described above, in this embodiment, the moving amount of the projection lens 7 is calculated by the moving amount calculation circuit 24 in advance. With this operation, focus adjustment can be performed by movement for once instead of performing the focus adjustment while moving the projection lens 7 on the optical axis several times. Therefore, the focus adjustment can be performed without distressing the observer.

In this embodiment, the half mirror 16 serving as a light beam split means may be pivoted, as indicated by an arrow C, to be retreated from the optical path after completion of the focus adjustment. With this operation, the illuminance on the screen 11 and the exposure amount on the photosensitive drum 15 can be prevented from being decreased.

The focus detection means 101 of this embodiment forms the images of pupils (exit pupils) 7c and 7d of the projection lens 7 on the entrance pupils of the pair of imaging lenses 20a and 20b by the imaging lens 17 and the field lens 19 to be symmetrical with respect to the optical axis, thereby forming two equivalent projected images on the pair of line sensors 21a and 21b, as shown in FIG. 2.

In FIG. 2, the pupils 7c and 7d of the projection lens 7 are imaged on the pupils of the pair of imaging lenses 20a and 20b. Therefore, a pupil imaging relationship is necessarily established for precise focus detection.

Figure 3:
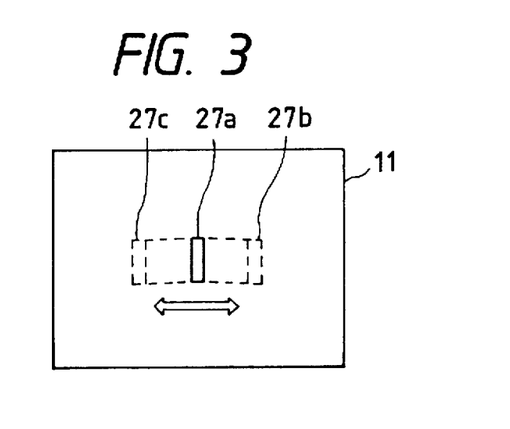
FIG. 3 is an explanatory view of part of FIG. 1.

When the focus detection means 101 is fixed, the distance measurement area in the projected image, i.e., the distance measurement area on the screen 11 is limited to a small area as an area 27a on the optical axis, as shown in FIG. 3. Therefore, when the projected image of a microfilm is not present in the area 27a on the screen 11, distance measurement is disabled.

When a film carrier (not shown) is moved to locate the image portion in the area 27a where distance measurement can be performed, distance measurement is enabled. However, from the viewpoint of a mechanical structure, the film carrier is preferably kept fixed to perform distance measurement.

Figure 4:
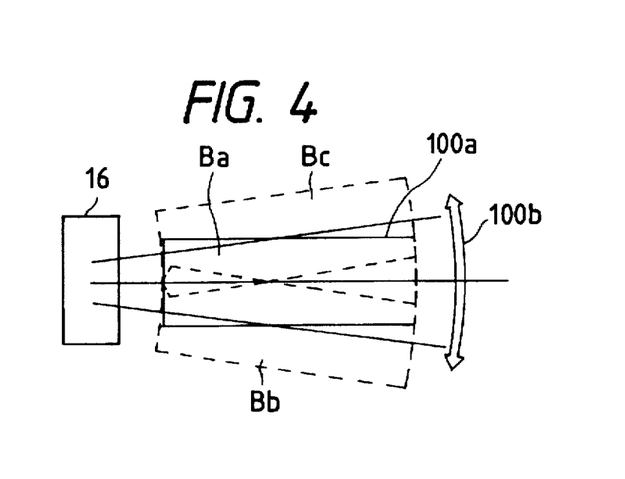
FIG. 4 is an explanatory view of part of FIG. 1.
Figure 5:
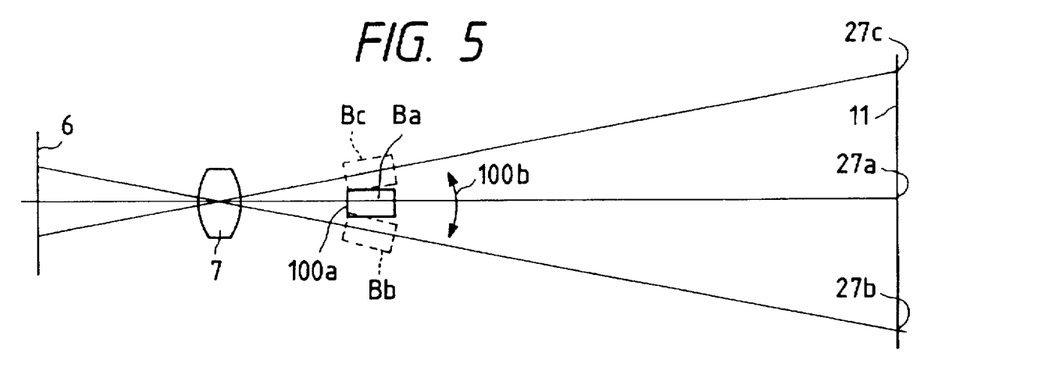
FIG. 5 is a view schematically showing a state wherein an optical path as part of FIG. 1 is developed.

In the present invention, as shown in FIGS. 4 and 5, the size of the half mirror 16 is set to almost cover a wide range on the screen 11. A housing 100a having the imaging lens 17 and the focus detection unit 100 is integrally pivoted to cover the field angle light beams (off-axis light beams) from the projection lens 7, as indicated by an arrow 10b. That is, the inclination of the housing 100a is changed in correspondence with a field angle.

FIGS. 4 and 5 are views showing the distance measurement areas 27a to 27c on the screen 11, which are defined when the housing 100a having the imaging lens 17 and the focus detection unit 100 is integrally pivoted to positions Ba to Bc, as indicated by the arrow 100a in FIG. 5.

In this embodiment, the housing 100a is pivoted while maintaining the optically conjugate relationship between the entrance pupils of the pair of reimaging lenses (imaging lenses for focus detection) 20a and 20b and the exit pupils 7c and 7d of the projection lens 7. Light beams passing through different areas of the pupils of the projection lens 7 are incident on the pupils of the reimaging lenses 20a and 20b. With this arrangement, distance measurement can be performed in a plurality of areas (27a to 27c) in a projected image. That is, the distance measurement range is increased.

Figure 6:
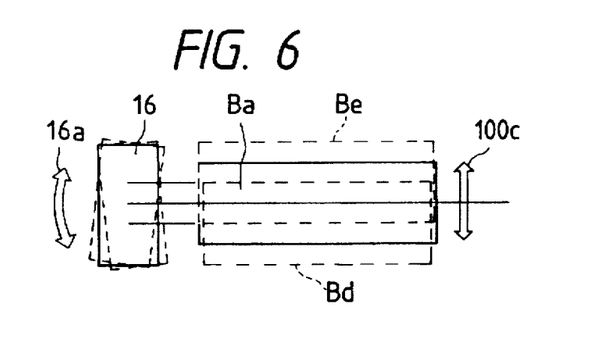
FIG. 6 is a view schematically showing the main part of part of an image forming apparatus according to the second embodiment of the present invention.
Figure 7:
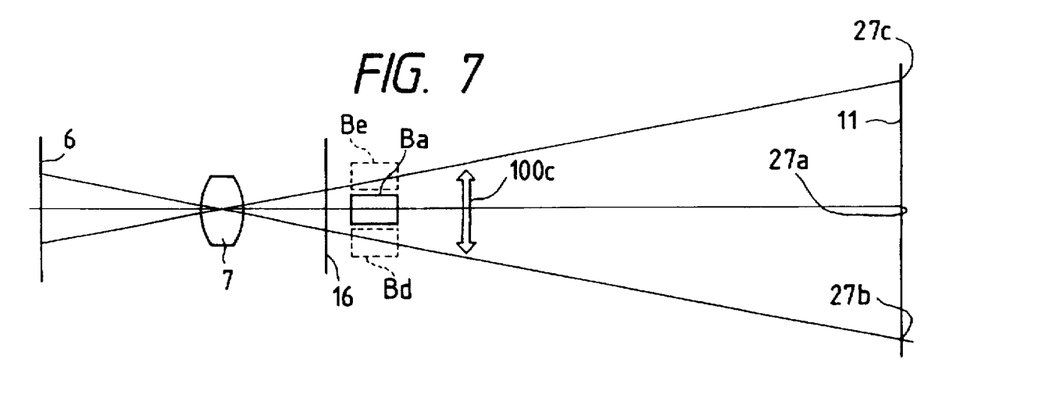
FIG. 7 is a view schematically showing the main part of part of the second embodiment of the present invention.

FIGS. 6 and 7 are views schematically showing the main part of part of an image forming apparatus according to the second embodiment of the present invention, in which a state wherein the optical path of part of FIG. 1 (corresponding to FIGS. 4 and 5) is developed is shown.

In this embodiment, the inclination of a light beam split means 16 with respect to the optical axis of a projection lens 7 is changed as indicated by an arrow 16a, unlike the first embodiment in FIG. 1. In addition, a housing 100a having an imaging lens 17 and a focus detection unit 100 is integrally moved in a direction perpendicular to an optical axis 7a of the projection lens 7, as indicated by an arrow 100c, and set at a position Be or Bd, thereby causing an off-axis light beam from the projection lens 7 to be incident on the housing 100a.

In this embodiment, as in the first embodiment, the housing 100a is moved while maintaining the optically conjugate relationship between the entrance pupils of a pair of reimaging lenses (imaging lenses for focus detection) 20a and 20b and exit pupils 7a and 7b of the projection lens 7. Light beams passing through different area of the pupils of the projection lens 7 are incident on the pupils of the reimaging lenses 20a and 20b.

With this arrangement, distance measurement can be performed while selecting one of a plurality of areas 27a, 27b, and 27c in a projected image.

According to the present invention, when an image is to be projected from a projection lens onto a screen or a photosensitive material (recording medium), a light beam split means, a focus detection unit, and the like are appropriately arranged on the exit side of the projection lens. With this arrangement, an image forming apparatus having a focus detection means, which can precisely perform focus detection in a plurality of areas in a projected image by appropriately displacing the elements and is suitable for a microfilm reader or microfilm reader/printer, can be realized.

An image forming apparatus according to still another embodiment of the present invention will be described below.

An image forming apparatus having a focus detection means of the present invention, in which an image illuminated with an illumination means is projected on a projection surface such as a screen or a recording medium by a projection lens, comprises at least two mirrors, i.e., first and second mirrors for deflecting an optical path, arranged on the exit side of a projection lens, a third mirror, arranged to be freely inserted/retreated in/from an optical path between the two mirrors, for reflecting at least part of an incident light beam in a direction perpendicular to a plane defined by the optical axis of the projection lens and the incident points of a light beam on the optical axis on the two mirrors, and a lens and a focus detection unit for detecting a focus state on the projection surface of the projection lens, which are arranged along the reflection direction of the third mirror.

Particularly, the third mirror, the lens, and the focus detection unit are integrally constituted and are moved along the reflection direction of the third mirror, thereby detecting a focus state on the projection surface of the projection lens.

Alternatively, the third mirror, the lens, and the focus detection mirror are integrally constituted and are moved along the reflection direction of a light beam reflected by the third mirror while changing an inclination in correspondence with the field angle of the projected image, which is expected by the focus detection unit, thereby detecting a focus state on the projection surface of the projection lens.

Figure 8:
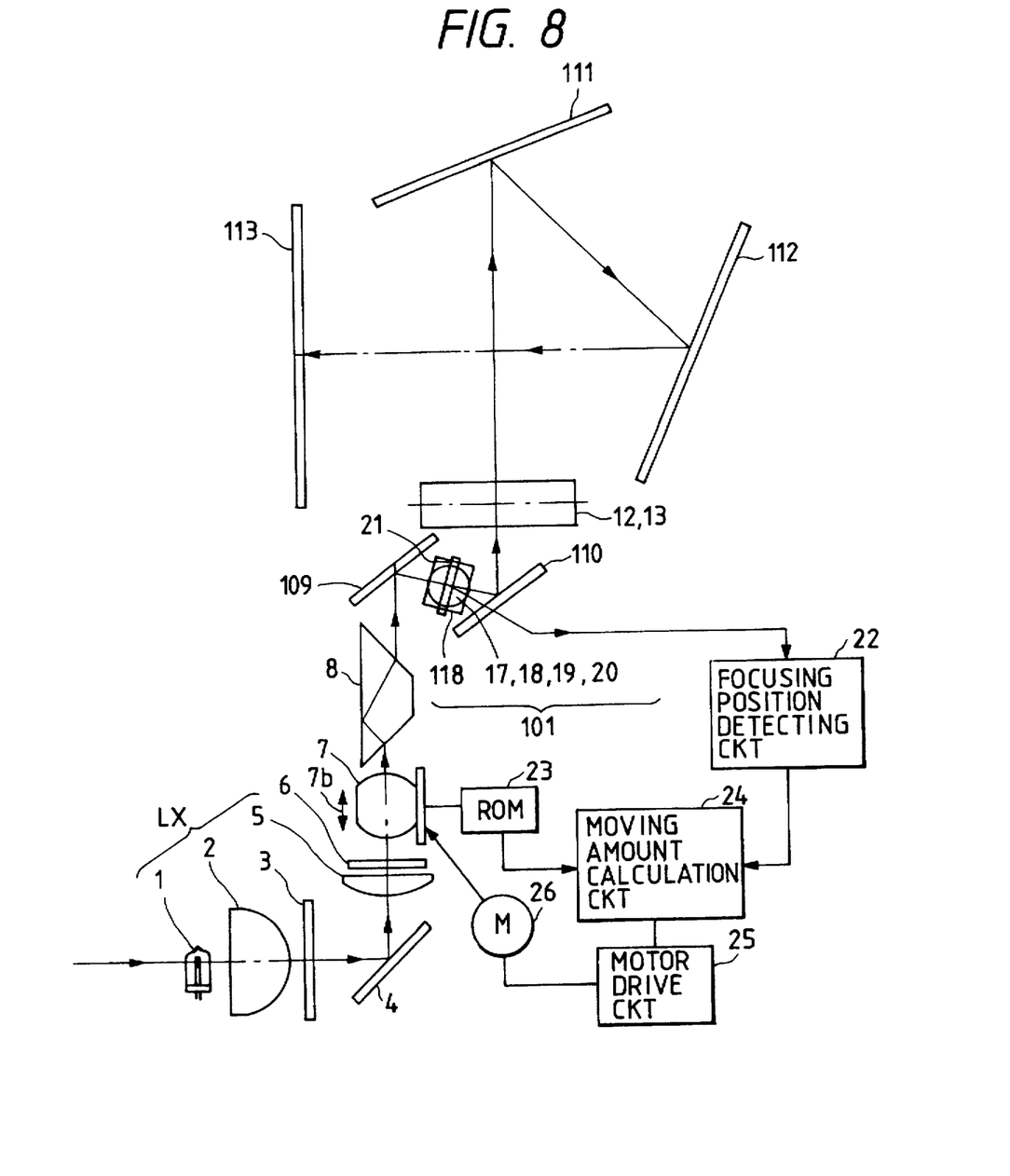
FIG. 8 is a view schematically showing the main part of the optical system of an image forming apparatus according to the third embodiment of the present invention.
Figure 9:
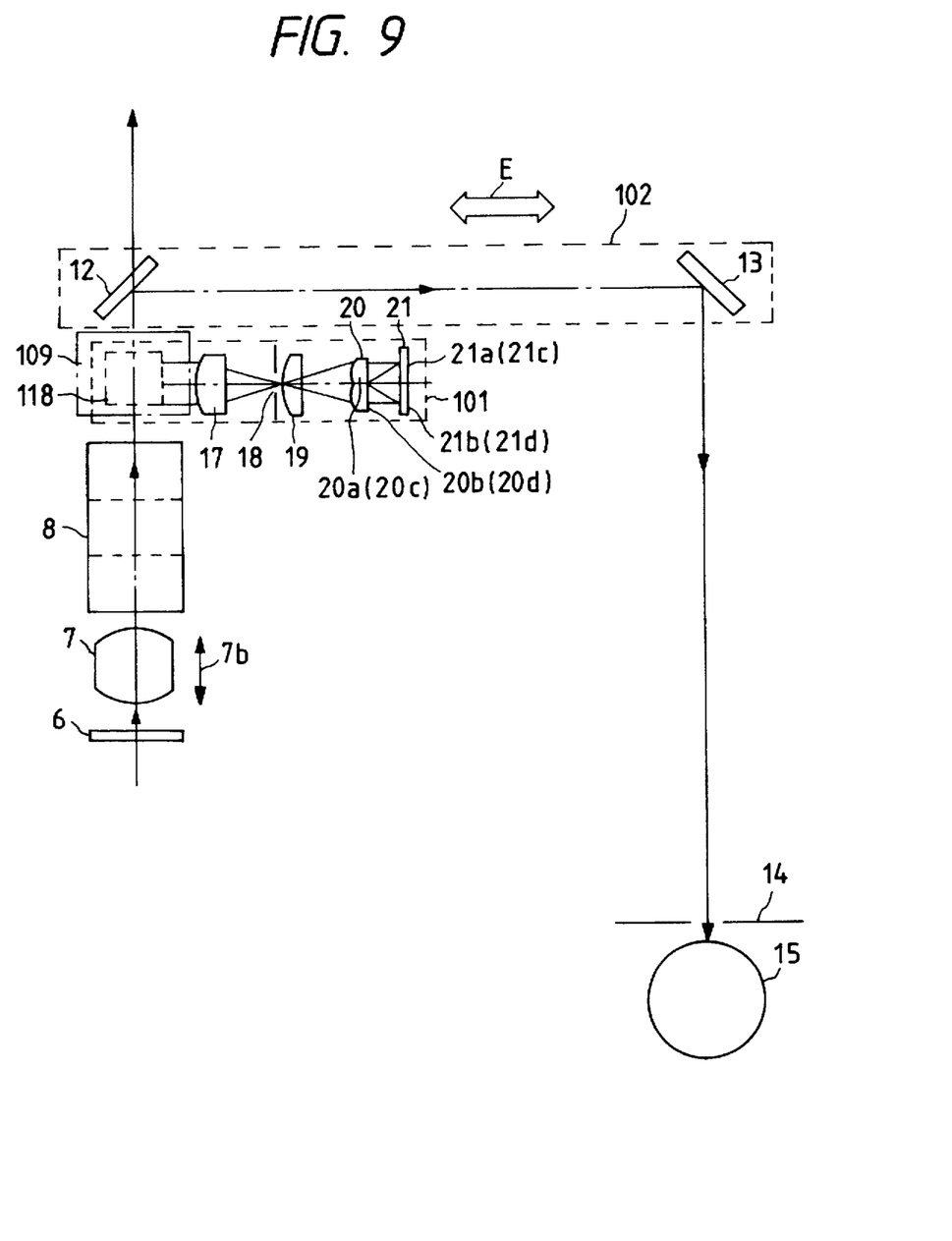
FIG. 9 is a view schematically showing the main part of part of FIG. 8 viewed from a screen side.
Figure 10:
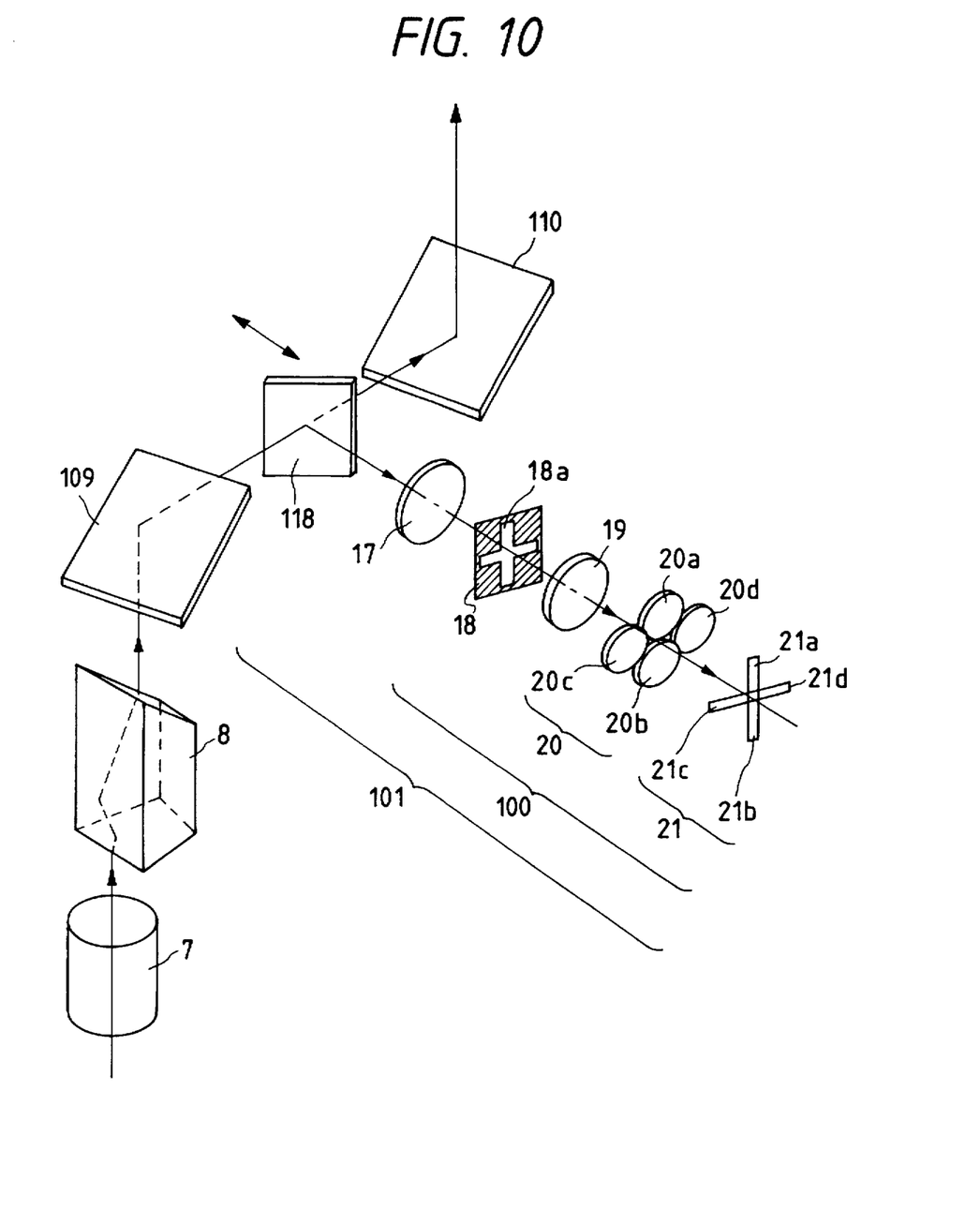
FIG. 10 is a perspective view of the main part of part of FIG. 8.

FIG. 8 is a view schematically showing the main part of the optical system of an image forming apparatus according to the third embodiment of the present invention. FIG. 9 is a view schematically showing a part of structure of FIG. 8 viewed from a screen 113 side. FIG. 10 is a perspective view of the main part of part of FIG. 8.

Referring to FIG. 8, a light source means 1 is constituted by, e.g., a halogen lamp or fluorescent light. A condenser lens 2 condenses a light beam from the light source means 1. Heat-insulating glass 3 and a cold mirror 4 serve as optical members for removing an infrared light component from a light beam radiated from the light source means 1 to suppress an increase in temperature on a projected image 6. The apparatus also includes a field lens 5. In this embodiment, the elements 1 to 5 constitute an illumination means (illumination optical system) LX.

The transmission type projected image (image information) 6 is formed of, e.g., a microfilm. A projection lens 7 enlarges and projects the image 6 on a screen 113 or a photosensitive drum (recording medium) 15.

Movement of the projection lens 7 is controlled by a driving means 26 on the basis of a signal (output value) obtained from a focus detection means 101 (to be described later), as indicated by an arrow 7b, on an optical axis. With this arrangement, focus adjustment (focusing) of a projected image on a screen 113 is performed.

A rotation prism 8 is arranged on the exit surface side of the projection lens 7 and has a function of correcting the microfilm image (projected image) 6 arranged to be inclined in a film surface to an arbitrary angle on the screen 113 or the photosensitive drum 15.

First and second mirrors 109 and 110 for deflecting the optical path are arranged near the exit side of the projection lens 7. The first and second mirrors 109 and 110 appropriately deflect the optical path of a light beam based on a projected image and guide the light beam to the screen 113 side and the photosensitive drum 15 side.

A third mirror 118 which can be freely inserted/retreated is constituted by a total reflecting mirror. The third mirror 118 arranged in the optical path between the first mirror 109 and the second mirror 110 reflects a light beam in a direction perpendicular to a plane defined by the optical axis of the projection lens 7 and the incident points of a light beam on the optical axis on the first and second mirrors 109 and 110. In this embodiment, a lens (reduction lens) 17 and a focus detection unit 100 for detecting a focus state on the projection surface of the projection lens 7 (both of which will be described later) are arranged along the reflection direction of the light beam reflected by the third mirror 118. The third mirror 118 in this embodiment is retreated from the optical path when the projected image 6 is to be projected on the screen 113 or the photosensitive drum 15, and inserted in the optical path when a focus state on the projection surface of the projection lens 7 is to be detected by the focus detection unit 100.

The reduction lens (imaging lens) 17 is used for focus detection. A distance measurement field mask 18 for focus detection is arranged near an expected imaging plane P of the reduction lens 17 to limit an amount of light incident on a light-receiving element (line sensor) 21 (to be described later) for focus detection as a light-receiving means. The field mask 18 has an opening portion 18a with, e.g., a cross shape to cross at almost the center of the projection surface of the projection lens 7.

A field lens 19 for focus detection has a positive refracting power and is arranged near the expected imaging plane P of the reduction lens 17. The field lens 19 has an optical function for guiding a projected image formed by the reduction lens 17 onto two pairs of line sensors (21a and 21b) and (21c and 21d) through two pairs of reimaging lenses (20a and 20b) and (20c and 20d) for focus detection (both of which will be described later).

The two pairs of reimaging lenses (20a and 20b) and (20c and 20d) are arranged symmetrical with respect to the optical axis. The two pairs of line sensors (21a and 21b) and (21c and 21d) are arranged symmetrical with respect to the optical axis in correspondence with the two pairs of reimaging lenses (20a and 20b) and (20c and 20d).

In this embodiment, the elements 18 to 21 constitute the focus detection unit 100, and the third mirror 118, the reduction lens 17, and the focus detection unit 100 constitute the focus detection means 101.

As will be described later, in this embodiment, when a focus state on the projection surface of the projection lens 7 is to be detected, the third mirror 118, the reduction lens 17, and the focus detection unit 100 are integrally moved along the reflection direction of a light beam reflected by the third mirror 118 while changing the inclination in correspondence with the field angle of the projected image, which is expected by the focus detection unit 100, thereby detecting a focus state of the projected image 6. The focus detection method of this embodiment uses a known so-called image displacement.

A focusing position detecting circuit 22 detects a focus state of the projection lens 7 by using an output signal from the line sensor 21. A moving amount calculation circuit 24 calculates the moving amount of the projection lens 7 on the optical axis by using an output signal from the focusing position detecting circuit 22, data from a ROM 23 storing the magnification information of the projection lens 7, and the like. A motor drive circuit 25 moves the projection lens 7 on the optical axis through the drive motor 26 on the basis of a signal from the moving amount calculation circuit 24.

A movable print scanning unit 102 has a scanning mirror 12 and a scanning mirror 13. The movable print scanning unit 102 moves into the optical path in a printing operation as indicated by an arrow E in FIG. 9, and retreats from the optical path in a reading operation. The direction of arrow E is a direction perpendicular to the sheet surface of FIG. 8. A print slit 14 limits an amount of light exposed onto the photosensitive drum 15. The photosensitive drum 15 is a recording medium. The system also includes a read reflecting mirror 111, a read reflecting mirror 112, and the screen 113.

In this embodiment, a light beam radiated from the light source means 1 is condensed by the condenser lens 2, transmitted through the heat-insulating glass 3, and reflected by the cold mirror 4. Thereafter, the light beam illuminates the effective illumination area of the projected image 6 through the field lens 5. The light beam based onbeam based on the projected image 6 passing through the projection lens 7 passes through the rotation prism 8 and is incident on the first mirror 109.

In this embodiment, the respective elements are set such that a light beam from the light source means 1 is converged (formed into an image) near the entrance pupil of the projection lens 7, i.e., Köhler illumination is performed.

In a reading operation in which the projected image 6 is observed on the screen 113, or in a printing operation in which a projected image is formed on the photosensitive drum 15, the third mirror 118 is retreated from the optical path. In a reading operation, a light beam based on a projected image reflected by the first and second mirrors 109 and 110 is guided onto the screen 113 through the reflecting mirrors 111 and 112 to form an enlarged projected image on the screen 113.

In a printing operation, the print scanning unit 102 moves into the optical path, as indicated by the arrow E, to cause a light beam based on a projected image reflected by the first and second mirrors 109 and 110 to be reflected by the scanning mirrors 12 and 13 and to be incident on the photosensitive drum 15 through the slit 14. An enlarged projected image is formed on the photosensitive drum 15.

At this time, the scanning mirrors 12 and 13 are integrally moved to scan the photosensitive drum 15 in a scanning direction, thereby projecting and recording image information of the overall projected image on the photosensitive drum 15.

When a focus state of the projection lens 7 is to be detected, the third mirror 118 is inserted into the optical path between the first mirror 109 and the second mirror 110. A light beam based on a projected image reflected by the third mirror 118 is formed into an image on the distance measurement field mask (expected focusing plane) 18 by the reduction lens 17. The formed projected image is projected on the two pairs of line sensors (21a and 21b) and (21c and 21d) by the two pairs of reimaging lenses (20a and 20b) and (20c and 20d) through the field lens 19.

More specifically, in this embodiment, a projected image formed near the distance measurement field mask 18 is formed as two pairs of projected images (light amount distributions) on the two pairs of line sensors (21a and 21b) and (21c and 21d) by the two pairs of reimaging lenses (20a and 20b) and (20c and 20d). The interval between the two pairs of projected images (light amount distributions) at that time is obtained by the focusing position detecting circuit 22, thereby detecting a focus state of the projection lens 7.

A signal from the focusing position detecting circuit 22, data from the ROM 23 storing the magnification information of the projection lens 7, and the like are used to obtain the moving amount of the projection lens 7 on the optical axis by the moving amount calculation circuit 24. On the basis of a signal from the moving amount calculation circuit 24, the projection lens 7 is moved in the direction of arrow 7b on the optical axis by the motor drive circuit 25 through the drive motor 26.

In this embodiment, the third mirror 118 is arranged to be freely inserted/retreated in/from the optical path. However, the present invention is not limited to this. The third mirror 118 may be pivotally arranged. Alternatively, the third mirror 118, the reduction lens 17, and the focus detection unit 100 may be integrally formed to be integrally movable with respect to the optical axis of the projection lens 7. Alternatively, even when the third mirror 118 is constituted by a half mirror which can be freely inserted/retreated or pivoted, the present invention can also be similarly applied as in the above embodiment.

The setting position of the focus detection means will be described below.

To execute a function of covering a wider field with a small line sensor (CCD) by reducing a projected image, the focus detection means 101 is preferably arranged near the projection lens 7 such that a light beam in a wide field can be received by a small reflecting mirror. For this purpose, the focus detection means 101 is appropriately arranged near the exit surface of the rotation prism 8, i.e., at the position of the first mirror 109 shown in FIG. 8. At this position, however, a support plate for supporting the holder of the projection lens 7, the holder of the rotation prism 8, and the like must be arranged, so this arrangement is not suitable in fact.

In this embodiment, a space for arranging the focus detection means 101 is ensured by deflecting the optical path by the first and second mirrors 109 and 110 not to interfere with the arrangement of the support plate. In addition, the third mirror 118 for reflecting a light beam in a direction perpendicular to a plane (sheet surface of FIG. 8) defined by the optical axis of the projection lens 7 and the incident points of a light beam on the optical axis on the first and second mirrors 109 and 110 is arranged in the optical path between the first mirror 109 and the second mirror 110, and the reduction lens 17 and the focus detection unit 100 are arranged in the reflection direction of the third mirror 118. With this arrangement, the focus detection means 101 can be arranged at a position that does not interfere with the rotating mechanism of the rotation prism 8, and the like.

As described above, in this embodiment, a space which is not used by the reader unit and the printer unit is effectively used, and the focus detection means is arranged in the space region, thereby maintaining the size without changing the size of the overall apparatus.

A method of increasing the distance measurement field in the focus detection means will be described below.

In the focus detection means employed in this embodiment, pupils 7c and 7d of the projection lens 7 are imaged on the pair of imaging lenses 20a and 20b arranged symmetrically with respect to the optical axis by the reduction lens 17 and the field lens 19, thereby forming two equivalent projected images on the pair of line sensors 21a and 21b, as shown in FIG. 2. In FIG. 2, each of a reimaging lens 20 and the line sensor 21 is constituted by a pair of elements, for the descriptive convenience.

Figure 11:
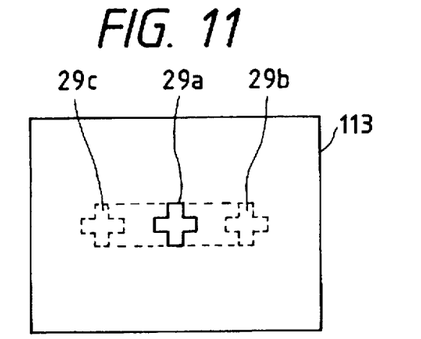
FIG. 11 is an explanatory view showing a state wherein a distance measurement field is increased by scanning of a focus detection system of the third embodiment of the present invention.

In FIG. 2, the pupils 7c and 7d of the projection lens 7 are imaged on the pupils of the pair of imaging lenses 20a and 20b. Therefore, unless a pupil imaging relationship is not established, focus detection cannot be performed. If the focus detection means 101 is fixed, the distance measurement field on the screen 113 is limited to a small area as an area 29a indicated by a solid line, as shown in FIG. 11. Therefore, when image information of the projected image of a microfilm is not present in the area 29a on the screen 113, distance measurement is disabled.

In this case, when a film carrier for holding the projected image 6 is moved to locate the image information (image portion) in the distance measurable area 29a, distance measurement is enabled. However, from the viewpoint of operability, the film carrier is preferably used while being kept fixed.

Figure 12A:
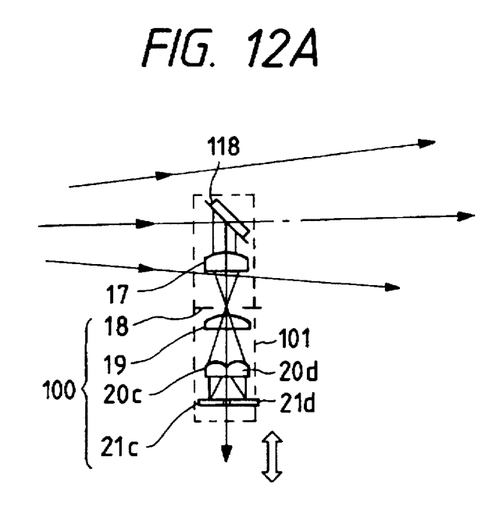
FIGS. 12A and 12B are explanatory views of the main part associated with scanning of the focus detection system of the third embodiment of the present invention.

In this embodiment, as shown in FIG. 12A, the third mirror 118, the reduction lens 17, and the focus detection unit 100 are integrally moved (scanned) in a direction substantially perpendicular to the optical axis of the projection lens 7 (in the reflection direction of a light beam reflected by the third mirror 118) in the optical path between the first mirror and the second mirror (neither are shown), thereby substantially increasing the distance measurement field.

Figure 12B:
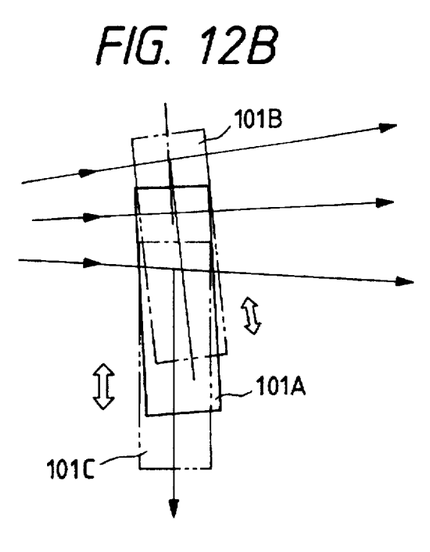

However, when the focus detection means 101 is only moved in a direction substantially perpendicular to the optical axis of the projection lens 7, pupil imaging as shown in FIG. 2 may not be established for an off-axis light beam with a field angle in some cases. In this embodiment, as shown in FIG. 12B, the focus detection means 101 is moved along the reflection direction of a light beam reflected by the third mirror 118 while changing the inclination of the focus detection means 101 (states 101B and 10C) in correspondence with the field angle of a projected image expected by the focus detection unit. With this operation, the distance measurement field range on the screen 113 is increased to three areas such as areas 29b, 29a, and 29c. In this manner, in this embodiment, distance measurement disable states are minimized, thereby detecting a focus state of a projected image.

In this embodiment, the inclination angle of the focus detection means 101 is set to almost ½ the field angle of a corresponding projected image 6. After completion of focus detection, the third mirror is retreated from the optical path, as described above. With this operation, the illuminance on the screen 113 and the exposure amount on the photosensitive drum 15 can be prevented from being decreased.

As described above, in this embodiment, even when a distance measurable area which can be detected by the focus detection unit 100 is small, a substantial distance measurable range is increased. With this operation, even if a large portion of an original image (microfilm) has no image information, a probability for disabling distance measurement can be largely decreased.

In this embodiment, each of the reimaging lens 20 and the line sensor 21, which form one element of the focus detection unit 100, are constituted by two pairs of elements. However, even with a pair of elements, the present invention can also be similarly applied as in the above embodiment.

According to the present invention, a first mirror and a second mirror are arranged on the exit side of a projection lens, a third mirror is arranged to be freely inserted/retreated in/from the optical path between the first mirror and the second mirror, and a lens and a focus detection unit are arranged along the reflection direction of the third mirror. With this arrangement, an image forming apparatus having a focus detection means, which can accommodate the focus detection means without largely changing the arrangement of other functional members, and maintain the size of the overall apparatus even when the focus detection means is added can be realized.

In addition, according to the present invention, when a focus state on the projection surface of a projection lens is to be detected, the third mirror, the lens, and the focus detection unit are integrally moved in a direction substantially perpendicular to the optical axis of the projection lens (in the reflection direction of the third mirror) between the first mirror and the second mirror. With this operation, the distance measurement field can be increased. Therefore, an image forming apparatus having a focus detection means, which can reduce states in which the distance measurement is impossible due to no image information existing in the distance measurable area, can be realized.

What is claimed is:

1. An image forming apparatus comprising:
   illumination means for illuminating an image;
   projecting means for projecting the image illuminated with said illumination means on a predetermined surface; and
   focus detection means for detecting a focus state of an image projected by said projecting means, said focus detection means including light beam split means arranged on an exit side of said projecting means, imaging means for forming an image of a light beam split by the light beam split means, and a focus detection unit for detecting a light beam formed into the image by the imaging means and said focus detecting unit includes a pair of imaging lenses for focus detection, and a light-receiving element,
   wherein at least part of said focus detection means is moved to detect the focus states in a plurality of areas in the projected images.

wherein said protecting means is a projection lens, light beams passing through different areas of a pupil of said projection lens are condensed by said pair of imaging lenses for focus detection to form a pair of light amount distributions on said light-receiving element, and a relative positional relationship between the pair of light amount distributions is obtained to detect the focus state, and wherein, when the focus state is to be detected, an optically substantially conjugate relationship is maintained between an entrance pupil of said pair of imaging lenses for focus detection and an exit pupil of said projection lens.

2. An apparatus according to claim 1, wherein the predetermined surface is one of a screen surface and a recording medium surface.

3. An apparatus according to claim 1, wherein said imaging means and said focus detection unit are integrally pivoted to detect the focus state.

4. An apparatus according to claim 1, wherein said imaging means and said focus detection unit are integrally moved in a direction perpendicular to an optical axis of said projection lens while changing an inclination of said light beam split means with respect to the optical axis of said projection lens, thereby detecting the focus state.

5. An apparatus according to claim 1, wherein said light beam split means, said imaging means, and said focus detection unit are integrally constituted and moved, thereby detecting the focus state.

6. An apparatus according to claim 1, further comprising first reflecting means and second reflecting means respectively arranged in an optical path between said projecting means and said focus detection means and in an optical path between said focus detection means and the predetermined surface.

7. Apparatus according to claim 1, wherein said light beam split means, said imaging means, and said focus detection unit are integrally constituted and moved along a direction for splitting the light beam by said light beam split means while changing an inclination in correspondence with a field angle of the projected image expected by the focus detection unit, thereby detecting the focus state.

8. A method of detecting a focus state of a projected image in an image forming apparatus, comprising the steps of:

illuminating an image by illumination means;

projecting the image illuminated with said illumination means on a predetermined surface by projecting means; and detecting the focus state in a plurality of areas in the projected image by moving at least part of focus detection means when the focus state of the projected image projected by said projecting means is to be detected by said focus detection means, wherein said focus detection means includes light beam split means arranged on an exit side of said projecting means, imaging means for forming an image of a light beam split by the light beam split means, and a focus detection unit for detecting a light beam formed into the image by the imaging means and said focus detection unit includes a pair of imaging lenses for focus detection, and a light-receiving element, wherein at least part of said focus detection means is moved to detect the focus states in the plurality of areas in the projected image, wherein said projecting means is a projection lens, light beams passing through different areas of a pupil of said projection lens are condensed by said pair of imaging lenses for focus detection to form a pair of light amount distributions on said light-receiving element, and a relative positional relationship between the pair of light amount distributions is obtained to detect the focus state, and wherein, when the focus state is to be detected, an optically substantially conjugate relationship is maintained between an entrance pupil of said pair of imaging lenses for focus detection and an exit pupil of said projection lens.

* * * * *

UNITED STATES PATENT AND TRADEMARK OFFICE
CERTIFICATE OF CORRECTION

PATENT NO. : 5,754,277
DATED      : May 19, 1998
INVENTOR   : KAZUO FUJIBAYASHI

It is certified that error appears in the above-identified patent and that said Letters Patent is hereby corrected as shown below:

COLUMN 2:

line 35, "a the" should read --the--.

COLUMN 5:

line 27, "performed" should read --performed.--.

COLUMN 6:

line 44, "10b." should read --100b.--.

COLUMN 7:

line 16, "area" should read --areas--; and
    line 41, "comprises" should read --comprises:--.

COLUMN 9:

line 50, "onbeam based" should be deleted.

UNITED STATES PATENT AND TRADEMARK OFFICE
CERTIFICATE OF CORRECTION

PATENT NO. : 5,754,277

DATED : May 19, 1998

INVENTOR : KAZUO FUJIBAYASHI

It is certified that error appears in the above-identified patent and that said Letters Patent is hereby corrected as shown below:

COLUMN 11:

line 64, "10C)" should read --101C)--.

COLUMN 12:

line 67, "images," should read --image,--.

COLUMN 13:

line 1, "protecting" should read --projecting--.

Signed and Sealed this

Ninth Day of February, 1999

Attest:

*Attesting Officer*

*Acting Commissioner of Patents and Trademarks*